(12) United States Patent
Dahlin

(10) Patent No.: US 7,484,027 B1
(45) Date of Patent: Jan. 27, 2009

(54) APPARATUS AND METHOD FOR CONFIGURABLE DEVICE PINS

(75) Inventor: Jeffrey J. Dahlin, Kenmore, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 99 days.

(21) Appl. No.: 11/207,399

(22) Filed: Aug. 18, 2005

Related U.S. Application Data

(60) Provisional application No. 60/611,626, filed on Sep. 20, 2004.

(51) Int. Cl.
G06F 13/14 (2006.01)
G06F 3/00 (2006.01)
G06F 1/00 (2006.01)

(52) U.S. Cl. .................... 710/305; 710/48; 713/300

(58) Field of Classification Search ............. 710/305, 710/48; 713/300
See application file for complete search history.

(56) References Cited

U.S. PATENT DOCUMENTS

| | | | | |
|---|---|---|---|---|
| 6,189,052 | B1* | 2/2001 | Nilsson et al. | 710/48 |
| 6,825,689 | B1* | 11/2004 | Snyder | 326/41 |
| 6,961,790 | B2* | 11/2005 | Swope et al. | 710/104 |
| 7,016,993 | B2* | 3/2006 | Lee | 710/100 |
| 7,047,343 | B2* | 5/2006 | Shaw | 710/305 |
| 7,106,103 | B2* | 9/2006 | Smith et al. | 326/82 |
| 7,109,744 | B1* | 9/2006 | Shumarayev et al. | 326/30 |
| 7,133,958 | B1* | 11/2006 | Kuskin | 710/313 |
| 7,143,360 | B1* | 11/2006 | Ogami et al. | 715/763 |
| 7,281,082 | B1* | 10/2007 | Knapp | 711/103 |
| 7,286,440 | B2* | 10/2007 | Yoo | 365/194 |
| 2003/0014573 | A1* | 1/2003 | Garies et al. | 710/58 |
| 2003/0097502 | A1* | 5/2003 | Bacigalupo | 710/100 |
| 2004/0054821 | A1* | 3/2004 | Warren et al. | 710/8 |
| 2004/0117698 | A1* | 6/2004 | Tran et al. | 714/724 |
| 2004/0230732 | A1* | 11/2004 | Touchet | 710/305 |
| 2005/0193154 | A1* | 9/2005 | Devine | 710/62 |
| 2005/0194991 | A1* | 9/2005 | Dour et al. | 326/30 |
| 2007/0024904 | A1* | 2/2007 | Baer et al. | 358/1.16 |
| 2007/0055793 | A1* | 3/2007 | Huang et al. | 710/8 |

* cited by examiner

*Primary Examiner*—Khanh Dang
*Assistant Examiner*—Christopher A Daley
(74) *Attorney, Agent, or Firm*—Blakely, Sokoloff, Taylor & Zafman LLP

(57) ABSTRACT

A method and apparatus for a configurable device contacts. A logic value on an external contact of a device is read. The external contact is selectively coupled to one of two voltage rails dependent upon the logic value. The logic value on the external contact is sensed to determine whether the logic value changed after selectively coupling the external contact to one of the two voltage rails. Based on the whether the external contact changed logic values, it is determined whether the external contact is coupled to receive a last address bit of an address.

18 Claims, 6 Drawing Sheets

APPARATUS AND METHOD FOR CONFIGURABLE DEVICE PINS

CROSS-REFERENCE TO RELATED APPLICATION

This application claims the benefit of U.S. Provisional Application No. 60/611,626, filed on Sep. 20, 2004, the contents of which are incorporated herein by reference.

TECHNICAL FIELD

This disclosure relates generally to electronic circuits, and in particular but not exclusively, relates to configurable bus interfaces.

BACKGROUND INFORMATION

Configuration solutions are widely used to enable a device to be configured for different operations. An example of a conventional configuration system 100 is shown in FIG. 1. In configuration system 100, configuration pins A(0), A(1), and A(2) (e.g., pins that set the address of a device) are dedicated for configuration purposes only. Unneeded configuration pins cannot be used for other functions, which may render them unused, wasting resources. Since different users often have different requirements, some users may desire maximized flexibility with a large number of configuration pins while other users may desire maximum functionality with large number of general purpose inputs/output ("GPIO") pins. With conventional configuration system 100, the circuit designer faces a trade-off between flexibility and functionality, and has to decide what is the optimum number of configuration pins verses GPIO pins.

Configuration pins A(0), A(1), and A(2) are dedicated address pins and cannot be used for other functions. Accordingly, the vendor of configuration system 100 has the choice of fabricating a large variety of configuration systems 100 each having a different number of configuration and GPIO pins tailor made for specific applications or fabricate a few alternative solutions designed to serve the widest variety of customer needs. Fabricating a large variety of configuration systems 100 each tailor made for a specific application fails to reap the efficiencies of large scale manufacturing. Fabricating a few alternative solutions designed to serve the widest variety of customer needs results in configuration systems not optimized for any one application.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of a system and method for implementing configurable device pins are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. A "pin", an "I/O pin", or a "device pin" are terms defined broadly herein to include any contact for coupling an integrated circuit ("IC") to a component or components external to the IC. For example, a pin may be a wire lead, a contact pad, a sold bump pad, or other connector structures for coupling to an IC. Furthermore, the term "pin" is not limited to a male connector but is defined broadly to include both male and female connectors, as well as, butt or surface mount connectors.

Figure 1:
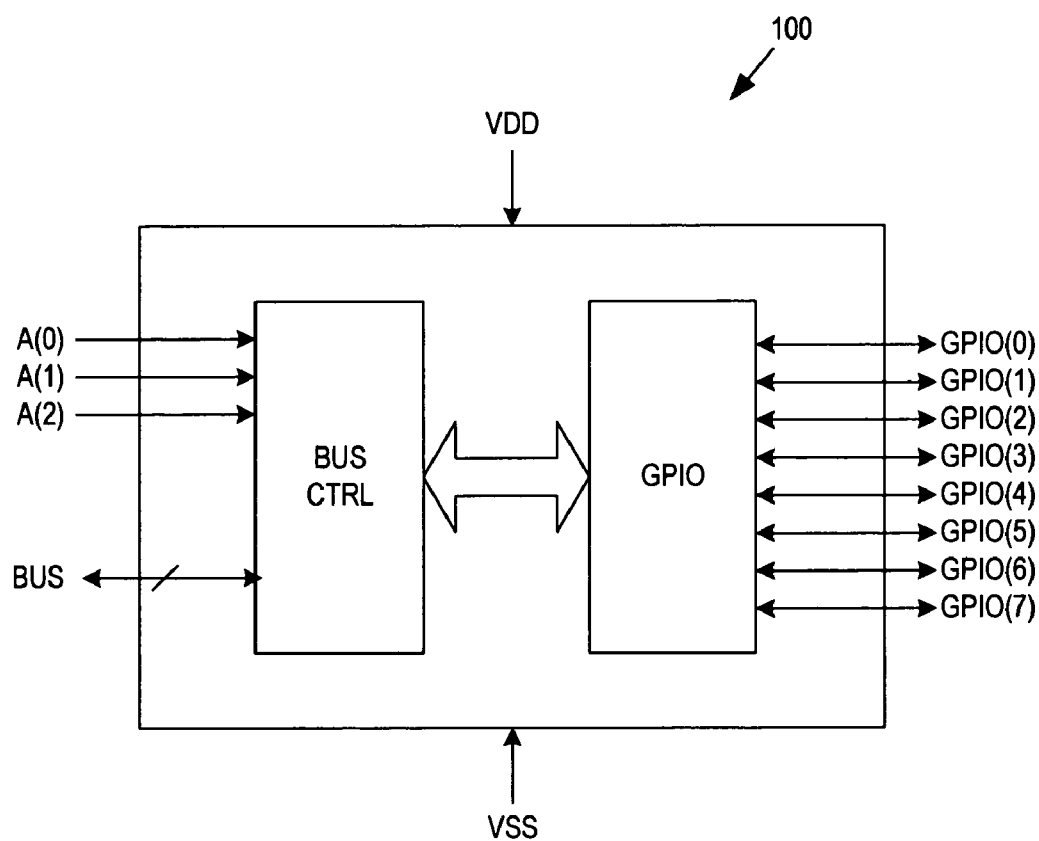
FIG. 1 is a functional block diagram illustrating a conventional configuration system having fixed configuration pins.
Figure 2:
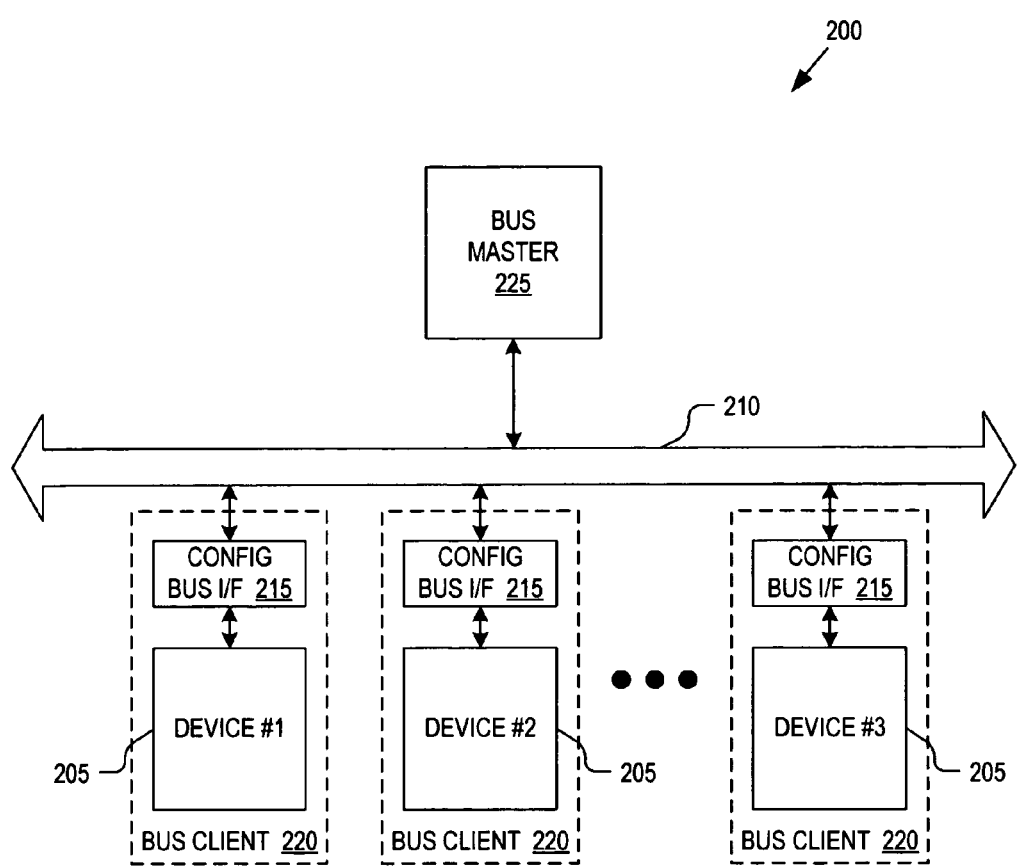
FIG. 2 is a functional block diagram illustrating bus environment having multiple bus client devices coupled to a bus via configurable bus interfaces, in accordance with an embodiment of the invention.

FIG. 2 is a functional block diagram illustrating a bus environment 200 having multiple bus clients devices 205 coupled to a bus 210 via configurable bus interfaces 215, in accordance with an embodiment of the invention. Collectively, bus client devices 205 and configurable bus interfaces 215 may be referred to as bus clients 220. Bus clients 220 may represent any devices which couple to and communicate over bus 210 sharing bus 210 as a connectivity resource.

In one embodiment, access to and communication over bus 210 may be controlled by a bus master 225. In this embodiment, bus clients 220 may represent slave devices. In general, bus 210 may represent any type of bus (e.g., serial bus, parallel bus, universal serial bus, a firewire interconnect, etc.). For example, in one embodiment, bus 210 is an I2C (Inter-IC) Bus design by Phillips. The I2C bus provides a mechanism for easy communication between components residing on the same circuit board. It should be appreciated that the I2C bus is mentioned by way of example, and further that embodiments of the present invention are equally applicable to any bus, even buses for communicating between circuit boards. Bus client devices 205 may represent any type of integrated circuit ("IC"), including but not limited to, communication chips, chipset components, graphics chips, peripheral device controllers, processors, and almost any other device coupling to a bus.

Since bus clients 220 reside on a common communication bus (i.e., bus 210), they generally require unique addresses so they can be individually identified. It is common to dedicate some pins of a device that can be tied to VDD (high voltage rail) or VSS (low voltage rail or ground) to set some bits of the address of a particular device. The remaining bits may be predefined as 1's or 0's. Previously, this required a trade off be made between minimizing the number of device pins dedicated to addressing and maximizing the number of unique addresses that can be provided by one silicon design. For instance, if two pins are used to select addresses, then only four instances of a device can be installed on a single bus. However, if seven pins are used, then up to 128 ($128=2^7$) devices can share a common bus.

Configurable bus interfaces 215 provide a mechanism for assigning bus addresses having a selectable length to bus client devices 205 using a single circuit design. Configurable bus interfaces 215 may include one dedicated address pin and a number of configurable input/output ("I/O") pins. The configurable I/O pins can be selectively configured to operate as address pins to receive address bits for setting a bus address of the corresponding bus client device 205 or configured to operate as I/O pins for communicating with bus client devices 205. In other words, configurable bus interfaces 215 represent a configuration system design capable of providing flexibility (long multi-bit bus address) and functionality (short or single bit bus addresses with many I/O pins for coupling to bus client devices 205) with a single circuit design.

Figure 3:
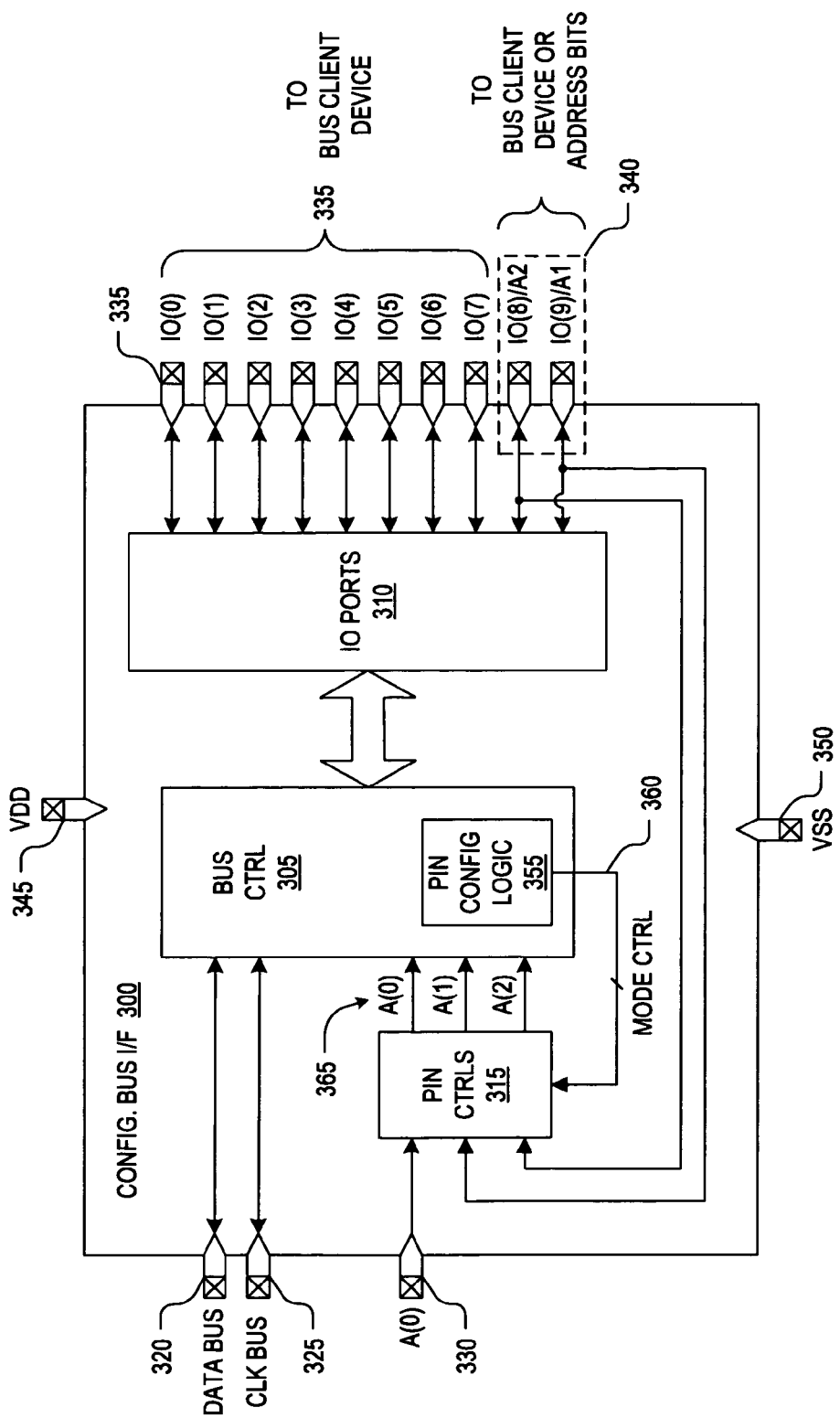
FIG. 3 is a functional block diagram illustrating a configurable bus interface including configurable input/output pins, in accordance with an embodiment of the invention.

FIG. 3 is a functional block diagram illustrating a configurable bus interface 300, in accordance with an embodiment of the invention. Configurable bus interface 300 is one possible implementation of configurable bus interfaces 215. The illustrated embodiment of configurable bus interface 300 includes a bus controller 305, I/O ports 310, pin controllers 315, a data bus pin 320, a clock bus pin 325, a dedicated address pin 330, I/O pins 335, configurable I/O pins 340, a VDD pin 345, and a VSS pin 350. In the illustrated embodiment, bus controller 305 includes pin configuration logic 355.

Bus controller 305 is coupled to send/receive data over data bus pin 320 to bus 210. Bus controller 305 may also be coupled to clock bus pin 325 to receive a bus clock signal therefrom. In one embodiment, bus controller 305 includes a finite state machine for performing a variety of functions including monitoring data received over data bus 320 (e.g., start and stop signals, address signals, etc.). Bus controller 305 may further include buffer logic, driver logic, and the like for sending and receiving data over data bus pin 320.

Data received on data bus pin 320 is forwarded to I/O ports 310 to be communicated to one of bus client devices 205 via I/O pins 335 and/or configurable I/O pins 340. In a like manner, data input to I/O ports 310 can be sent on data bus pin 320. I/O ports 310 may include a serializer/deserializer ("SERDES") unit for converting a serial data stream into a parallel data stream. I/O ports 310 may further include buffer logic, driver logic, and the like for sending and receiving data over I/O pins 335 and/or configurable I/O pins 340.

As illustrated, bus controller 305 further includes pin configuration logic 355. Pin configuration logic 355 is coupled to determine whether configurable I/O pins 340 are operating as address pins for setting a bus address of a bus client device 205 or operating as I/O ports for communicating with a coupled bus client device 205. Pin configuration logic 355 further includes logic for determining whether dedicated address pin 330 is the only address pin and therefore the "last address pin" or whether some of configurable I/O pins 340 are operating as address pins and therefore one of them is the last address pin. Pin configuration logic 355 makes this last address pin determination with aid from pin controllers 315. Pin controllers 315 include circuit components for testing dedicated address pin 330 and configurable I/O pins 340 under the control of pin configuration logic 355. Pin configuration logic 355 sets the mode of operation of pin controllers 315 via a mode control signal 360 and receives feedback information via read lines 365. In one embodiment, pin controllers 315 further include drive logic for driving output data on configurable I/O pins 340.

Although only a single data bus pin 320 is illustrated, several data bus pins may be included within configurable bus interface 300 for coupling to a parallel bus. Similarly, although FIG. 3 illustrates eight I/O pins 335, two configurable I/O pins 340, and one dedicated address pin 330, it should be appreciated that the illustrated configuration is only an example. Embodiments of the invention may include more or less I/O pins 335, more or less configurable I/O pins 340, and even no dedicated address pin 330 or multiple dedicated address pins 330.

It should further be appreciated that FIG. 3 illustrates configurable bus interface 300 from a functional perspective. Accordingly, although the components are illustrated as distinct entities, in practicality this may not be the case. For example, some of the circuit components of pin controller 315 may in fact reside within bus controller 305 or be situated in various positions around configurable bus interface 300, for example adjacent to configurable I/O pins 340. Configuration bus interface 300 may be encompassed within a single chip package and the subcomponents integrated within a single semiconductor die or spread across multiple semiconductor dies.

Figure 4:
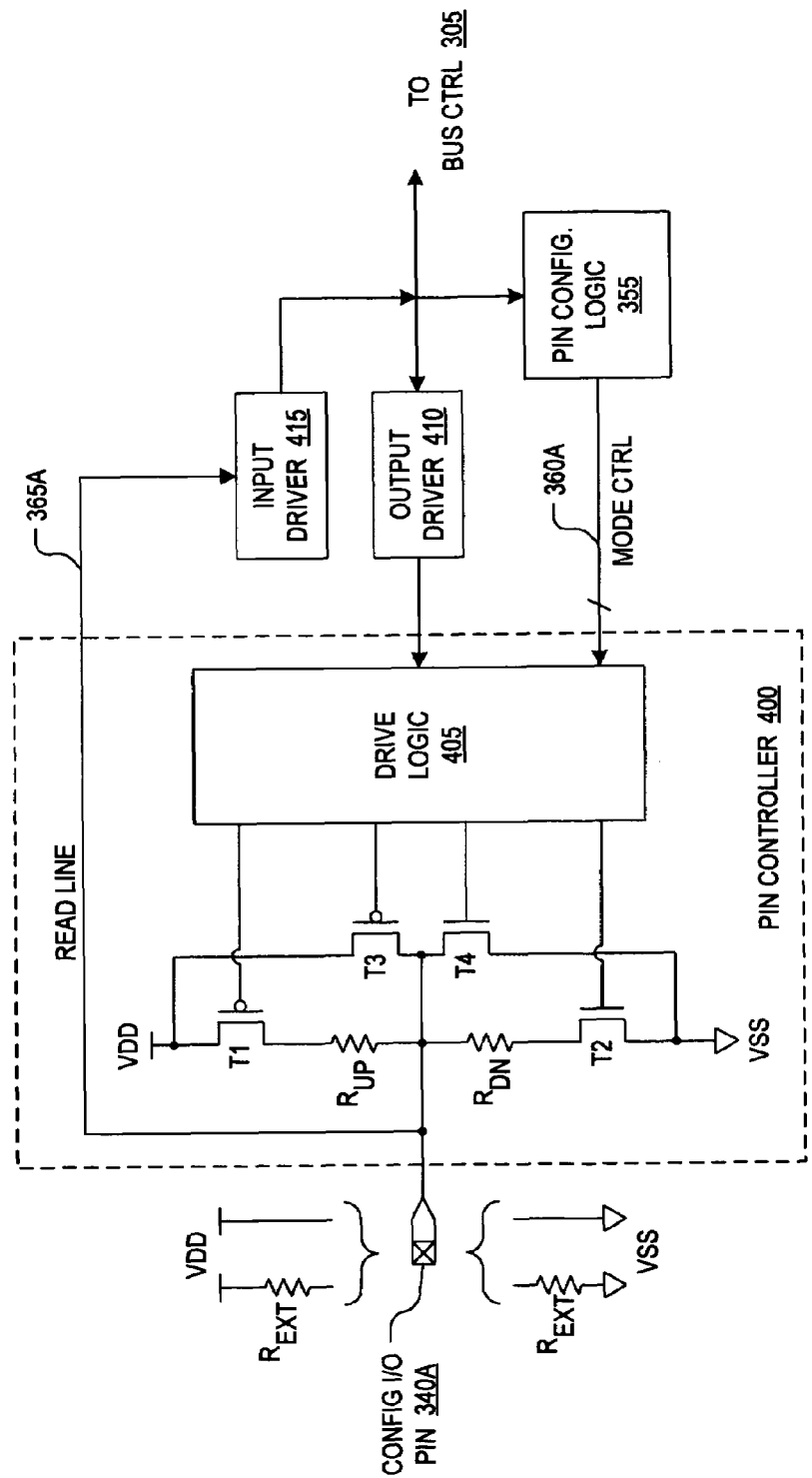
FIG. 4 is a circuit diagram illustrating a pin controller coupled to test a configurable input/output pin for determining whether the configurable input/output pin is coupled to receive a last address bit of a bus address, in accordance with an embodiment of the invention.

FIG. 4 is a circuit diagram illustrating a pin controller 400 coupled to a configurable I/O pin 340A for determining whether configurable I/O pin 340A is coupled to receive a last address bit of a bus address, in accordance with an embodiment of the invention. The illustrated embodiment of pin controller 400 includes drive logic 405, a pull up resistor Rup, a pull down resistor Rdn, test transistors T1 and T2, drive transistors T3 and T4, and a read line 365A.

Pin controller 400 represents only a portion of pin controller 315 illustrated in FIG. 3. Pin controller 400 illustrated that portion of pin controller 315 coupled to a single configurable I/O pin 340A; however, it should be appreciated that the illustrated circuitry may be replicated for each configurable I/O pin 340 illustrated in FIG. 3. Furthermore, a modified version of pin controller 400 may also be coupled to dedicated address pin 330. In one embodiment, this modified version may exclude drive transistors T3 and T4 since dedicated address pin 330 may not need output drive capability.

The components of pin controller 400 are interconnected as follows. Pull up resistor Rup and test transistor T1 are coupled in series between voltage rail VDD and configurable I/O pin 340A. Pull down resistor Rdn and test transistor T2 are coupled in series between voltage rail VSS and configurable I/O pin 340A. Test transistors T1 and T2 are coupled to drive logic 405 to be selectively enable/disabled under its control. In turn, drive logic 405 is controlled via mode control signal 360A generated by pin configuration logic 355. Pull up resistor Rup and pull down resistor Rdn are selectively coupled (disabled/enabled) to configurable I/O pin 340A to test whether configurable I/O pin 340A is coupled to receive the last address bit (discussed in detail in connection with FIG. 5).

If configurable I/O pin 340A is configured to operate as an address pin, then the voltage or logic value applied to configurable I/O pin 340A represents an address bit. If configurable I/O pin 340A is operating as an address pin, then it may be the case that it is coupled to receive either an intermediate address bit of the bus address or the last address bit of the bus address. In one embodiment, the status of a pin (either a dedicated address pin 330 or any of configurable I/O pins 340 such as the illustrated example of configurable I/O pin 340A) as being coupled to receive the last address bit is determined based on the termination resistance of the pin through an external resistor Rext. In one embodiment, if external resistor Rext has a low resistance relative to pull up and pull down resistors Rup and Rdn, then configurable I/O pin 340A is determined to be coupled to received the last address bit. Similarly, if external resistor Rext has a high resistance relative to the pull up and pull down resistors Rup and Rdn, then configurable I/O pin 340A is determined to be coupled to received an intermediate address bit (e.g., not the last address bit).

In one embodiment, the ratio of resistances between pull up resistor Rup (and pull down resistor Rdn) and the external resistor Rext is 10 to 1 or greater. For example, if pull up resistor Rup and pull down resistor Rdn are approximately 5k Ω, then external resistor Rext may be <330Ω to designate a last address bit or external resistor Rext may be >50k Ω to designate an intermediate address bit. The ratio between the pull up resistor Rup (and pull down resistor Rdn) and the external resistor Rext may be determined by the threshold levels of the logic technology used to implement embodiments of the invention.

Of course, the above convention can be swapped with a low external resistance for external resistor Rext representing an intermediate address bit and a high external resistance for external resistor Rext representing the last address bit. Furthermore, configurable I/O pin 340A may be directly terminated to one of the voltage rails without an external resistor to designate the last address bit, as opposed to using a low resistance for external resistor Rext.

Drive logic 405 is coupled to receive output data from bus controller 305 for communication to one of bus client devices 205 via configurable I/O pin 340A. Output driver 410 buffers and/or amplifies the received data from bus controller 305, which may have been received over data bus pin 320. The received data is driven onto configurable I/O pin 340A for communication to one of bus client devices 205 with drive transistors T3 and T4 under the control of drive logic 405. In one embodiment, test transistors T1 and T2 may also be used to drive data onto configurable I/O pin 340A in a drive mode of operation. Using test transistors T1 and T2 to drive in a drive mode would enable a "strong" or "weak" drive mode for configurable I/O pin 340A.

Data received from one of bus client devices 205 via configurable I/O pin 340A is coupled into input driver 415 via read line 365A. Input driver 415 may include a buffer and/or amplifier for receiving the data and providing the received data to bus controller 305.

Figure 5:
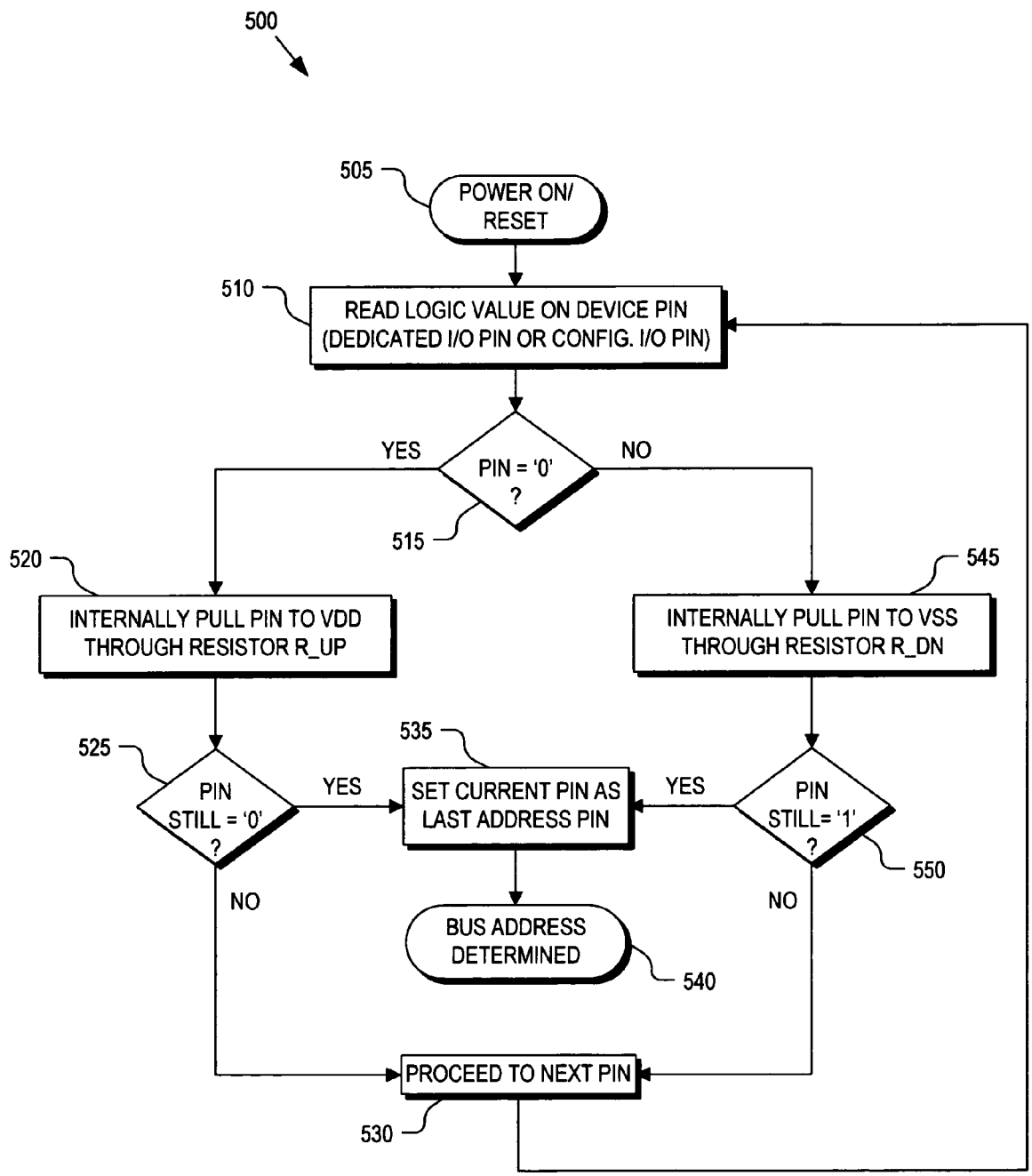
FIG. 5 is a flow chart illustrating a process for determining whether a configuration pin is coupled to receive a last address bit of a bus address, in accordance with an embodiment of the invention.

FIG. 5 is a flow chart illustrating a process 500 for determining whether a dedicated address pin or a configuration I/O pin is coupled to receive a last address bit of a bus address, in accordance with an embodiment of the invention. Process 500 is described with reference to configurable I/O pin 340A illustrated in FIG. 4; however, process 500 is equally applicable to any of dedicated address pin 330 or configurable I/O pins 340. The order in which some or all of the process blocks appear in process 500 should not be deemed limiting. Rather, one of ordinary skill in the art having the benefit of the present disclosure will understand that some of the process blocks may be executed in a variety of orders not illustrated.

In a process block 505 configurable bus interface 300 is powered on or reset. Configurable bus interface 300 may be powered on when power is asserted to bus 210 or when power is otherwise asserted to a processing system incorporating bus client 220. In a process block 510, the logic value applied to configurable I/O pin 340A is read via read line 365A and provided to pin configuration logic 355 via input driver 415. The logic value asserted on configurable I/O pin 340A may be set based on the voltage rail (e.g., VDD or VSS) to which configurable I/O pin 340A is tied.

If the logic value is a logic '0' (LOW logic level or VSS), then process 500 continues to a process block 520 (decision block 515). In process block 520, pin configuration logic 355 instructs drive logic 405 via mode control signal 360A to pull configurable I/O pin 340A towards VDD by enabling test transistor T1 and disabling test transistor T2. With test transistor T1 closed circuited, internal pull up resistor Rup forms a voltage divider with the external resistor Rext. If the logic value on configurable I/O pin 340A changes (i.e., changes from logic '0' to logic '1'), then external resistor Rext must have a larger resistance than pull up resistor Rup (decision block 525). In this case, configurable I/O pin 340A is determined to be an intermediate address pin and therefore not coupled to received the last address bit. In a process block 530, pin configuration logic 355 proceeds to test the next configurable I/O pin 340 to determine whether it is the last address pin coupled to receive the last address bit.

Returning to decision block 525, if the logic value on configurable I/O pin 340A remains the same (i.e., still logic '0'), then external resistor Rext must have a smaller resistance than pull up resistor Rup. In this case, configurable I/O pin 340A is set as the last address pin coupled to receive the last address bit (process block 535). With the last address pin determined, the bus address of the coupled bus client device 205 is determined (process block 540). It should be appreciated that configurable I/O pins 340 need not be assigned to received the last address bits. Rather, configurable I/O pins 340 may be coupled to receive intermediate address bits, and therefore determining the complete bus address includes combining the values coupled to configurable I/O pins 340 with predetermined values for the remaining address bits.

Returning to decision block 515, if configurable I/O pin 365A is coupled to logic '1' (HIGH logic value or VDD), then process 500 continues to a process block 545. In process block 545, pin configuration logic 355 instructs drive logic 405 via mode control signal 360A to pull configurable I/O pin 340A towards VSS by enabling test transistor T2 and disabling test transistor T1. With test transistor T2 closed circuited, internal pull down resistor Rdn forms a voltage divider with external resistor Rext. If the logic value on configurable I/O pin 340A changes (i.e., changes from logic '1' to logic '0'), then external resistor Rext must have a larger resistance than pull down resistor Rdn (decision block 550). In this case, configurable I/O pin 340A is determined to be an intermediate address pin and therefore not coupled to receive the last address bit. In a process block 530, pin configuration logic 355 proceeds to test the next configurable I/O pin 340 to determine whether it is the last address pin coupled to receive the last address bit.

If the logic value on configurable I/O pin 340A remains the same (i.e., still logic '1'), then external resistor Rext must have a smaller resistance than pull down resistor Rdn. In this case, configurable I/O pin 340A is set as the last address pin coupled to receive the last address bit (process block 535) and the bus address of the coupled bus client device 205 is determined (process block 540). If should be appreciated that while the resistance of external resistor Rext (or nonexistence of external resistor Rext) determines whether a given pin is the designated as the last address pin, the actual logic value on the pin read in process block 510 determines each address bit of the bus address.

Process 500 continues to loop from process block 530 back to process block 510 to systematically test each dedicated address pin 330 and configurable I/O pin 340 in order, until the last address pin is discovered. Once the last address pin is determined, pin configuration logic 355 does not proceed to test remaining or subsequent configuration I/O pins 340, as these pins may be used as I/O pins (e.g., general purpose I/O pins). Therefore, whether these untested configurable I/O pins are terminated with low or high resistances to a bus client device 205 is inconsequential.

Figure 6:
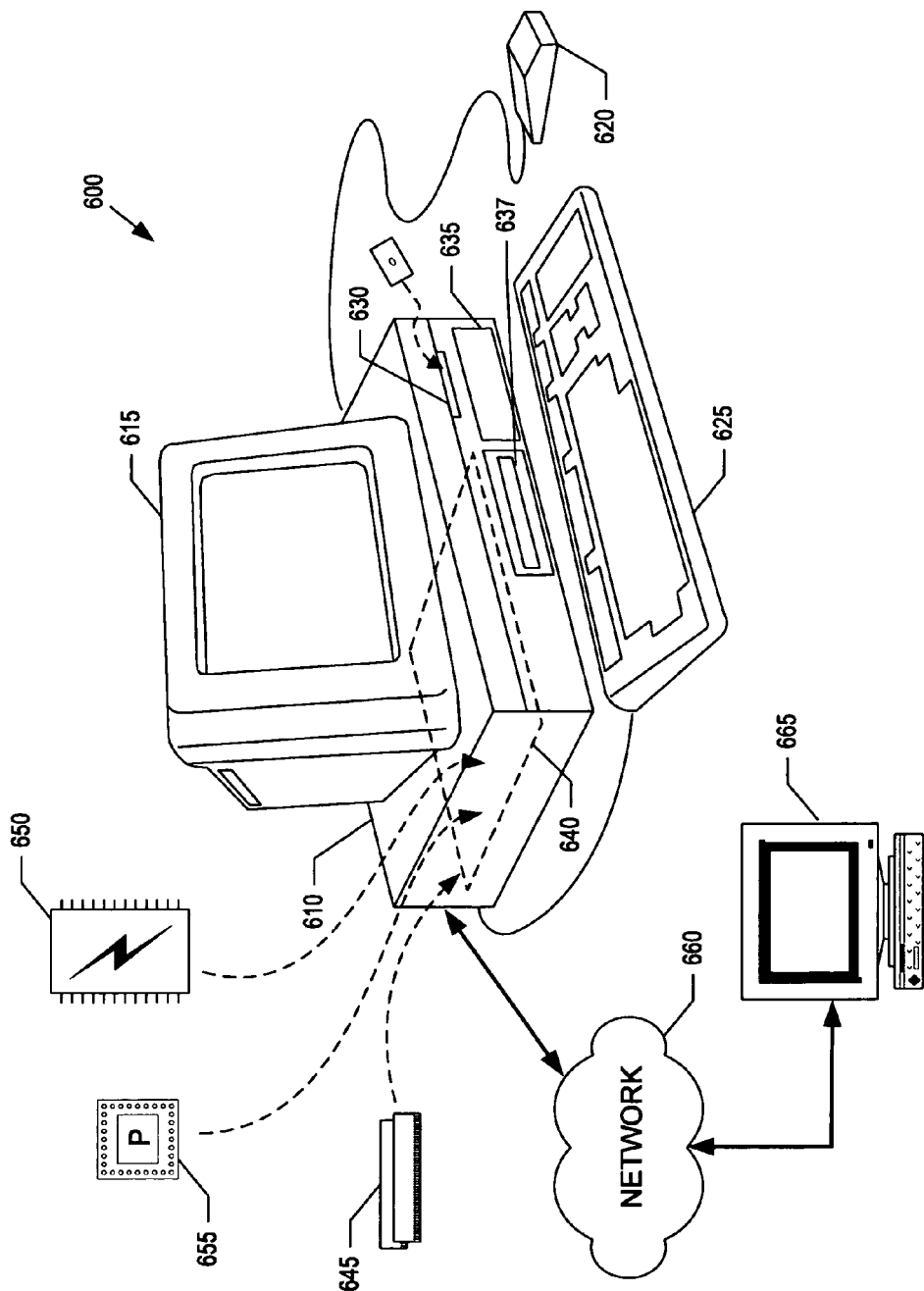
FIG. 6 is a perspective drawing illustrating a demonstrative processing system incorporating an embodiment of the invention.

FIG. 6 is a diagram of a system 600 that implements embodiments of the present invention. The illustrated embodiment of system 600 includes a chassis 610, a monitor 615, a mouse 620 (or other pointing device), and a keyboard 625. The illustrated embodiment of chassis 610 further includes a floppy disk drive 630, a hard disk 635, a compact disc ("CD") and/or digital video disc ("DVD") drive 637, a power supply (not shown), and a motherboard 640 populated with appropriate integrated circuits including system memory 645, nonvolatile ("NV") memory 650, and one or more processor(s) 655 (e.g. IC 110).

Processor(s) 655 is communicatively coupled to system memory 645, NV memory 650, hard disk 635, floppy disk drive 630, and CD/DVD drive 637 via a chipset on motherboard 640 to send and to receive instructions or data thereto/therefrom. In one embodiment, NV memory 650 is a flash memory device. In other embodiments, NV memory 650 includes any one of read only memory ("ROM"), programmable ROM, erasable programmable ROM, electrically erasable programmable ROM, or the like. In one embodiment, system memory 645 includes random access memory ("RAM"), such as dynamic RAM ("DRAM"), synchronous DRAM, ("SDRAM"), double data rate SDRAM ("DDR SDRAM") static RAM ("SRAM"), and the like. Hard disk 635 represents any storage device for software data, applications, and/or operating systems, but will most typically be a nonvolatile storage device. Hard disk 635 may optionally include one or more of an integrated drive electronic ("IDE") hard disk, an enhanced IDE ("EIDE") hard disk, a redundant array of independent disks ("RAID"), a small computer system interface ("SCSI") hard disk, and the like.

In one embodiment, a network interface card ("NIC") (not shown) is coupled to an expansion slot (not shown) of motherboard 640. The NIC is for connecting system 600 to a network 660, such as a local area network, wide area network, or the Internet. In one embodiment network 660 is further coupled to a remote computer 665, such that system 600 and remote computer 665 can communicate.

Configurable bus interface 215 may be incorporated onto motherboard 640 and used to interface any of the subcomponents (e.g., processor 655, nonvolatile memory 650, system memory 645, hard disk 635, floppy disk drive 630, CD/DVD drive 637, and the like) with one or more interconnects or buses. Additionally, configurable bus interface 215 may even be used to couple processing system 600 to network 660.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A configurable bus interface, comprising:
   a dedicated address pin to set a first address bit of a bus address;
   a configurable input/output ("I/O") pin configurable to alternatively operate as a data pin or an address pin; and
   pin configuration logic coupled to the configurable I/O pin to determine whether the configurable I/O pin is operating to set an address bit of a bus address to identify a device for coupling to a bus via the configurable bus interface and coupled to determine whether the configurable I/O pin is alternatively operating as an I/O port for communicating with the device, the pin configuration logic is further coupled to the dedicated address pin and to the configurable I/O pin to determine if either of the dedicated address pin or the configurable I/O pin is a last address pin.

2. The configurable bus interface of claim 1, further comprising a pin controller coupled to the configurable I/O pin and to the dedicated address pin, the pin controller to selectively test the dedicated address pin and the configurable I/O pin under direction of the pin configuration logic to determine if either of the dedicated address pin or the configurable I/O pin is the last address pin.

3. The configurable bus interface of claim 2, wherein the pin controller includes:
   a pull up resistor selectively coupled between a first voltage rail and the configurable I/O pin;
   a pull down resistor selectively coupled between a second voltage rail and the configurable I/O pin; and
   a read line coupled to the configurable I/O pin to sense a logic value on the configurable I/O pin and coupled to provide the logic value to the pin configuration logic.

4. The configurable bus interface of claim 3, wherein the pin controller further includes:
   a first transistor coupled in series with the pull up resistor;
   a second transistor coupled in series with the pull down resistor; and
   drive logic coupled to selectively enable and disable the first and second transistors under direction of the pin configuration logic.

5. The configurable bus interface of claim 4, wherein the pin controller further comprises:
   a third transistor coupled between the configurable I/O pin and the first voltage rail to selectively couple the configurable I/O pin to the first voltage rail to drive output data on the configurable I/O pin; and
   a fourth transistor coupled between the configurable I/O pin and the second voltage rail to selectively couple the configurable I/O pin to the second voltage rail to drive output data on the configurable I/O pin.

6. The configurable bus interface of claim 1, further comprising:
   a data bus pin to couple to the bus; and
   a plurality of I/O pins to couple to the device, the configurable bus interface to interconnect the data bus to the device and to set the bus address of the device.

7. The apparatus of claim 6, further comprising:
a bus controller including the pin configuration logic, the bus controller coupled to the data bus pin, the bus controller to monitor the data bus pin and to control operation of the configurable bus interface; and
a plurality of I/O ports coupled to the plurality of I/O pins, wherein the plurality of I/O pins comprise general purpose I/O pins.

8. A method, comprising:
reading a logic value on an external contact of a device;
selectively coupling the external contact to one of two voltage rails dependent upon the logic value;
sensing whether the logic value of the external contact changes after the selectively coupling; and
determining whether the external contact is coupled to receive a last address bit of an address based on the sensing.

9. The method of claim 8, wherein the device comprises a configurable bus interface, wherein the configurable bus interface communicatively couples a bus client device to a bus, and wherein the address comprises a bus address associated with the bus client device by the configurable bus interface.

10. The method of claim 9, wherein the external contact comprises a dedicated address pin of the configurable bus interface and wherein reading the logic value comprises reading an address bit of the bus address associated with the bus client device.

11. The method of claim 9, wherein the external contact comprises a configurable input/output ("I/O") pin of the configurable bus interface, the configurable I/O pin having a selectable dual purpose as an address port for receiving an address bit or an I/O port for communicating I/O data with the bus client device.

12. The method of claim 11, wherein
if the configurable I/O pin is determined to be coupled to receive the last address bit of the bus address of the bus client device, then configuring other configurable I/O pins of the configurable bus interface to communicate I/O data with the bus client device, else
if the configurable I/O pin is determined not to be coupled to receive the last address bit of the bus address of the bus client device, then configuring at least one other configurable I/O pin to receive another address bit and testing the at least one other configurable I/O pin to determine if the at least one other configurable I/O pin is coupled to receive the last address bit.

13. The method of claim 8, wherein selectively coupling the external contact to one of the two voltage rails dependent upon the logic value comprises:
internally pulling the external contact toward a HIGH voltage rail through a pull up resistor, if the logic value is a LOW logic value; and else
internally pulling the external contact toward a LOW voltage rail through a pull down resistor, if the logic value is a HIGH logic value.

14. The method of claim 13, wherein determining whether the external contact is coupled to receive the last address bit of the address based on the sensing comprises:
determining that the external contact is not coupled to receive the last address bit of the address, if the logic value on the external contact changes due to internally pulling the external contact toward one of the two voltage rails; and else
determining that the external contact is coupled to receive the last address bit of the address, if the logic value on the external contact remains the same after internally pulling the external contact toward one of the two voltage rails.

15. A system, comprising:
a bus;
a bus client device; and
a configurable bus interface coupling the bus client device to the bus, the configurable bus interface including:
a dedicated address contact coupled to set a first address bit of a bus address of the bus client device;
a configurable input/output ("I/O") contact having a selectable dual purpose as an address port for setting an address bit of the bus address associated with the bus client device and alternatively as an I/O port for communicating I/O data with the bus client device; and
configuration logic coupled to the configurable I/O contact to determine whether the configurable I/O contact is operating to set the address bit of the bus address identifying the bus client device on the bus and to determine whether the configurable I/O pin is alternatively operating as the I/O port for communicating with the bus client device, the configuration logic is further coupled to the dedicated address contact and the dedicated address contact to determine if either of the dedicated address contact or the configurable I/O contact is a last address contact coupled to receive a last address bit of the bus address associated with the bus client device.

16. The system of claim 15, wherein the configurable bus interface further comprises a contact controller coupled to the configurable I/O contact, the contact controller coupled to test the configurable I/O contact under control of the configuration logic, the contact controller including:
a pull up resistor selectively coupled between a first voltage rail and the configurable I/O contact;
a pull down resistor selectively coupled between a second voltage rail and the configurable I/O contact; and
a read line coupled to the configurable I/O contact to sense a logic value on the configurable I/O contact and coupled to provide the logic value to the configuration logic.

17. The system of claim 15, wherein the configurable bus interface further includes:
a plurality of general purpose I/O contacts coupled to the bus client device; and
a plurality of the configurable I/O contacts, a first portion of the configurable I/O contacts each coupled to one of two voltage rails to set the bus address of the bus client device, wherein one of the first portion of configurable I/O contacts is coupled to one of the two voltage rails via a different resistance than others of the first portion indicating a last address bit, a second portion of the configurable I/O contacts coupled to the bus client device to communicate with the bus client device.

18. The system of claim 15, wherein the bus comprises an inter-integrated circuit ("I2C") bus.

* * * * *